United States Patent [19]
Oishi

[11] 3,819,507
[45] June 25, 1974

[54] DEHYDROCYCLIZATION OF PARAFFINS AND CATALYST THEREFOR

[75] Inventor: Masayoshi Oishi, Wilmington, Del.

[73] Assignee: Sun Research and Development Co., Philadelphia, Pa.

[22] Filed: June 15, 1972

[21] Appl. No.: 263,080

[52] U.S. Cl............... 208/139, 208/138, 260/673.5
[51] Int. Cl............................................. C10g 35/06
[58] Field of Search .......... 208/139, 138; 260/673.5

[56] References Cited
UNITED STATES PATENTS

| | | | |
|---|---|---|---|
| 2,971,904 | 2/1961 | Gladrow et al. | 208/135 |
| 3,146,279 | 8/1964 | Gallagher | 260/683.65 |
| 3,369,997 | 2/1968 | Hayes et al. | 208/139 |
| 3,397,137 | 8/1968 | Pickert et al. | 208/138 |
| 3,415,737 | 12/1968 | Kluksdahl | 208/139 |
| 3,438,888 | 4/1969 | Spurlock | 208/138 |
| 3,558,479 | 1/1971 | Jacobson et al. | 208/139 |
| 3,676,328 | 7/1972 | Dalson et al. | 208/65 |
| 3,679,578 | 7/1972 | Dalson et al. | 208/138 |
| 3,755,486 | 8/1973 | Oishi et al. | 208/139 |

Primary Examiner—Delbert E. Gantz
Assistant Examiner—James W. Hellwege
Attorney, Agent, or Firm—George L. Church; J. Edward Hess; F. C. Hilberg, Jr.

[57] ABSTRACT

Process of dehydrocyclizing $C_6$–$C_{10}$ hydrocarbons using a lithium, sodium or potassium zeolite X or a lithium, sodium or potassium zeolite Y which zeolite has been impregnated with from 0.10 to 1.2 wt. percent platinum and from 0.10 to 1.2 wt. percent rhenium and then reduced with hydrogen to the free metal. The dehydrocyclization reaction is carried out at from 500° to 560° C. and preferably from 510° to 555° C. using a partial pressure of hydrogen of from 10 to 300 p.s.i.g. and preferably from 50 to 200 p.s.i.g. to form benzene and alkylbenzenes.

6 Claims, No Drawings

DEHYDROCYCLIZATION OF PARAFFINS AND CATALYST THEREFOR

BACKGROUND OF THE INVENTION

In the processing of petroleum into gasoline it is known that normal paraffins are undesirable gasoline components because of their very low octane ratings. Generally modern refining technology calls for reforming the straight run gasoline fraction using a supported noble metal catalyst. Generally this reforming is carried out at 450 to 500 p.s.i.g. and converts naphthenes into aromatics and normal paraffins into isoparaffins. It is also known that the normal paraffins can be removed from the straight run gasoline by means of mole sieves. This is not generally carried out commercially because of the expense involved and the extremely low value of one of the products, namely the normal paraffins. The present invention is directed to upgrading these normal paraffins into high octane gasoline components particularly aromatics. These aromatics have a wide variety of other well known uses such as solvents, etc.

SUMMARY OF THE INVENTION

The present invention relates to the dehydrocyclization of paraffins and particularly normal paraffins containing from six to 10 carbon atoms to form aromatic compounds.

The catalyst used in the present invention is a zeolite which has been impregnated with platinum and rhenium and then had the platinum and rhenium reduced to the free metal state. This catalyst has more stable catalyst activity under severe dehydrocyclization reaction conditions as compared with similar catalysts which do not contain rhenium. The zeolites used in the present invention are zeolite X and zeolite Y. Generally the alkali metal zeolites and especially the sodium zeolites are preferred. Sodium zeolite X has the typical formula:

Sodium zeolite Y has the typical formula:

A further description of these zeolites may be found in "Crystalline Molecular Sieves" by D. W. Breck, JOURNAL OF CHEM. EDUCATION, 41, 678–689 (1964).

If desired part or all of the sodium associated with the zeolite may be exchanged with lithium or potassium.

DESCRIPTION

After the desired zeolite starting material such as sodium zeolite Y, it is impregnated with from 0.10 to 1.2 wt. percent platinum and from 0.10 to 1.2 wt. percent rhenium. Below about 0.10 wt. percent platinum, the catalyst is not sufficiently active. Above about 1.2 wt. percent platinum insufficient improvement in catalyst activity is obtained to warrant the use of expensive platinum. The zeolite is readily impregnated with the platinum by treatment with an aqueous solution of chloroplatinic acid at a moderately elevated temperature. The rhenium is also readily impregnated on the zeolite by application of an aqueous solution of a soluble rhenium compound followed by evaporation of the water. The two metals may be impregnated on the zeolite simultaneously or individually. Generally simultaneous impregnation is preferred. In a typical preparation a large quantity of sodium zeolite Y such as Linde SK-40 is air dried in an oven overnight at 120°C. A portion of $H_2PtCl_6$ (0.5 g.) and $Re_2O_7$ (0.65 g.) are dissolved in 250 ml. of distilled water and placed in a 500 ml. round bottom glass flask which is immersed in a 60°C. constant temperature bath. A 100 g. portion of the dried sodium zeolite Y is slowly added to the flask and the mixture is allowed to stand overnight at 60°C. The impregnated mixture is then transferred to a 600 ml. beaker and the water slowly evaporated using a stirring hot plate. When the mixture can no longer be stirred it is transferred to an evaporating dish and air dried overnight. The catalyst is then dried in an oven at 120°C. for 24 hours. The catalyst is then removed from the oven, hand ground and redried in the oven over a weekend. A portion of the catalyst is analyzed and formed to contain 0.28 wt. percent rhenium, 0.33 wt. percent platinum and 0.25 wt. percent chlorine. The desired amount of catalyst is packed in the reactor being used and calcined in air at 500°C. for 2 hours, followed by reduction with hydrogen at 500°C. for 2 hours. The catalyst is then ready for use. It is preferred that the catalyst contain from 0.3 to 1.5 wt. percent chlorine to help disperse the platinum and rhenium.

The hydrocarbon to be dehydrocyclized is passed through the reactor containing the catalyst at a liquid hourly space velocity of from 0.1 to 40 and preferably two to 15. The dehydrocyclization is carried out at from 500° to 560°C. and preferably from 510° to 555°C., above 555°C. and especially above 560°C. the amount of cracking taking place starts to increase rapidly. Below 500°C. the amount of conversion of the paraffin is too low. The amount of cyclization as compared to the amount of isomerization increases considerably at around 510°C.

The dehydrocyclization is carried out under moderate pressure expressed herein in terms of the partial pressure of hydrogen in the reactor. The partial pressure of hydrogen generally is from 10 to 300 p.s.i.g. with from 50 to 200 p.s.i.g. being the preferred range. Below 50 p.s.i.g. and especially below 10 p.s.i.g. coking of the catalyst becomes too rapid to be economical. As the pressure increases above 200 p.s.i.g. and especially above 300 p.s.i.g. the cracking and isomerization reactions become favored instead of the dehydrocyclization reaction.

Suitable paraffinic starting materials contain from six to 10 carbon atoms. Generally the normal paraffins are preferred because due to their low octane numbers they can be improved more than the branched paraffins which have higher octane numbers. Normally the feedstream will be the normal hydrocarbons removed by the denormalization of a $C_6$–$C_{10}$ petroleum stream which would consist essentially of $C_6$–$C_{10}$ normal hydrocarbons.

DESCRIPTION OF THE PREFERRED EMBODIMENTS

In Examples I to VI a pulse microreactor is used. This reactor is a stainless steel tube 200 mm. long and having an inside diameter of 4 mm. The inside of the tube contains Pyrex glass wool retainers which keep the catalyst in place. In each of Examples I to VI the tube is packed with 0.125 g. of zeolite Y catalyst prepared in accordance with the description given above. The tube is fitted in a brass mounting sleeve which contains a thermocouple in a well. The brass sleeve in turn is mounted in a 4 inch electric furnace operated on 115 volts and controlled by a 7.5 amp powerstat. The top of the tube is fitted with a silicone rubber septum mounted in a septum holder with a carrier gas inlet. The carrier gas is deoxygenated dry hydrogen passed through the system at a rate of 50 cc. per minute under the pressure indicated in the particular example being reported. The catalyst is preconditioned by injecting a 30 microliter pulse of the $n$-heptane which is being dehydrocyclized. The reactor effluent from this injection is not analyzed. A 2 microliter charge of the $n$-heptane being dehydrocyclized is then injected through the septum into the reactor and the resultant effluent is programmed through a previously calibrated gas chromatograph.

TABLE

| Example | Temperature, °C. | Pressure, p.s.i.g. | PRODUCTS | | | |
| --- | --- | --- | --- | --- | --- | --- |
| | | | Toluene wt. % | Isoheptanes wt. % | Hexane & Lower Paraffins, wt. % | n-Heptane wt. % |
| 1 | 500 | 100 | 4.0 | 30.6 | 4.2 | 61.2 |
| 2 | 500 | 50 | 5.9 | 25.5 | 6.8 | 61.8 |
| 3 | 530 | 100 | 12.3 | 27.8 | 15.7 | 44.2 |
| 4 | 530 | 50 | 19.4 | 26.6 | 18.8 | 35.2 |
| 5 | 550 | 100 | 22.6 | 20.8 | 25.4 | 31.2 |
| 6 | 550 | 50 | 36.3 | 15.0 | 25.3 | 23.2 |

The invention claimed is:

1. A process of dehydrocyclizing a feed-stream consisting essentially of normal paraffins containing from six to 10 carbon atoms comprising contacting said feed-stream with a zeolite selected from the class consisting of zeolite X and zeolite Y, the exchangeable metal ions of which zeolite consisting essentially of ions selected from the class consisting of lithium, sodium and potassium and which zeolite is impregnated with from 0.10 to 1.2 wt. percent platinum in the free metal state and from 0.10 to 1.2 wt. percent rhenium in the free metal state, at from 500° to 560°C., at a liquid hourly space velocity of from 0.1 to 40, under a hydrogen partial pressure of from about 50 to about 200 p.s.i.g., whereby at least a portion of the normal paraffins are dehydrocyclized.

2. The process of claim 1 wherein the temperature is from 510° to 555°C.

3. The process of claim 2 wherein the liquid hourly space velocity is from two to 15.

4. The process of claim 3 wherein the exchangeable metal ions in the zeolite are sodium.

5. The process of claim 4 wherein the zeolite is zeolite Y.

6. The process of claim 5 wherein the zeolite contains from 0.3 to 1.5 wt. percent chlorine.

* * * * *